(12) United States Patent
Sumi

(10) Patent No.: US 11,860,598 B2
(45) Date of Patent: Jan. 2, 2024

(54) CONTROL SYSTEM AND CONTROL METHOD

(71) Applicant: Panasonic Intellectual Property Management Co., Ltd., Osaka (JP)

(72) Inventor: Fumio Sumi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 4 days.

(21) Appl. No.: 17/629,491

(22) PCT Filed: Aug. 3, 2020

(86) PCT No.: PCT/JP2020/029692
§ 371 (c)(1),
(2) Date: Jan. 24, 2022

(87) PCT Pub. No.: WO2021/024990
PCT Pub. Date: Feb. 11, 2021

(65) Prior Publication Data
US 2022/0283557 A1 Sep. 8, 2022

(30) Foreign Application Priority Data
Aug. 8, 2019 (JP) .................... 2019-146852

(51) Int. Cl.
*G05B 19/042* (2006.01)
*G06F 3/16* (2006.01)
*H04L 12/28* (2006.01)
(52) U.S. Cl.
CPC .......... *G05B 19/042* (2013.01); *G06F 3/167* (2013.01); *H04L 12/281* (2013.01); *H04L 12/282* (2013.01); *G05B 2219/2639* (2013.01)

(58) Field of Classification Search
CPC .......... G05B 19/042; G05B 2219/2639; G05B 2219/2642; G05B 15/02; G05B 19/418;
(Continued)

(56) References Cited

U.S. PATENT DOCUMENTS

2015/0066169 A1\* 3/2015 Nakano .................. G05B 15/02
 700/90
2017/0251093 A1\* 8/2017 Park .................. H04M 1/72412

FOREIGN PATENT DOCUMENTS

| CN | 104991461 A | 10/2015 |
| CN | 107272433 A | 10/2017 |

(Continued)

OTHER PUBLICATIONS

International Search Report for corresponding Application No. PCT/JP2020/029692, dated Oct. 13, 2020.
(Continued)

*Primary Examiner* — Tejal Gami
(74) *Attorney, Agent, or Firm* — Renner, Otto, Boisselle & Sklar, LLP

(57) ABSTRACT

A control system includes: a communication unit that sends, to each of a plurality of devices, a control command for controlling the device; a registration unit that registers a standard action for collectively controlling at least two devices included in the plurality of devices, based on device control consecutiveness which is determined by control history information of the plurality of devices; and an executor that causes the communication unit to send a control command to each of the at least two devices when execution of the standard action registered is instructed.

16 Claims, 17 Drawing Sheets

(58) Field of Classification Search
CPC ....... G06F 3/167; G06F 13/00; H04L 12/281;
H04L 12/282; H04L 12/2829; H04L
67/125; H04L 12/2803; Y02P 90/02;
H04Q 9/00
See application file for complete search history.

(56) References Cited

FOREIGN PATENT DOCUMENTS

| | | |
|---|---|---|
| CN | 109559740 A | 4/2019 |
| JP | 2012-060718 A | 3/2012 |
| JP | 2012-175377 A | 9/2012 |
| JP | 2016-181180 A | 10/2016 |
| WO | 2014/024442 A1 | 2/2014 |

OTHER PUBLICATIONS

Written Opinion for corresponding Application No. PCT/JP2020/029692, dated Oct. 13, 2020.
Chinese Office Action for corresponding CN Patent Application No. 202080050963.6 dated Nov. 23, 2022.

\* cited by examiner

FIG. 3

|   | Sending time | Target device | Content of control |
|---|---|---|---|
| A | 2019/4/8 8:05 | Lighting | Turn on |
| A | 2019/4/8 8:09 | Air conditioner | Turn on |
| A | 2019/4/8 8:13 | Electric shutter | Open |
| B | 2019/4/9 8:06 | Lighting | Turn on |
| B | 2019/4/9 8:08 | Electric shutter | Open |
| B | 2019/4/9 8:11 | Air conditioner | Turn on |
| B | 2019/4/9 8:12 | Exterior lighting | Turn off |
| C | 2019/4/10 8:04 | Electric shutter | Open |
| C | 2019/4/10 8:08 | Lighting | Turn on |
| C | 2019/4/10 8:12 | Air conditioner | Turn on |

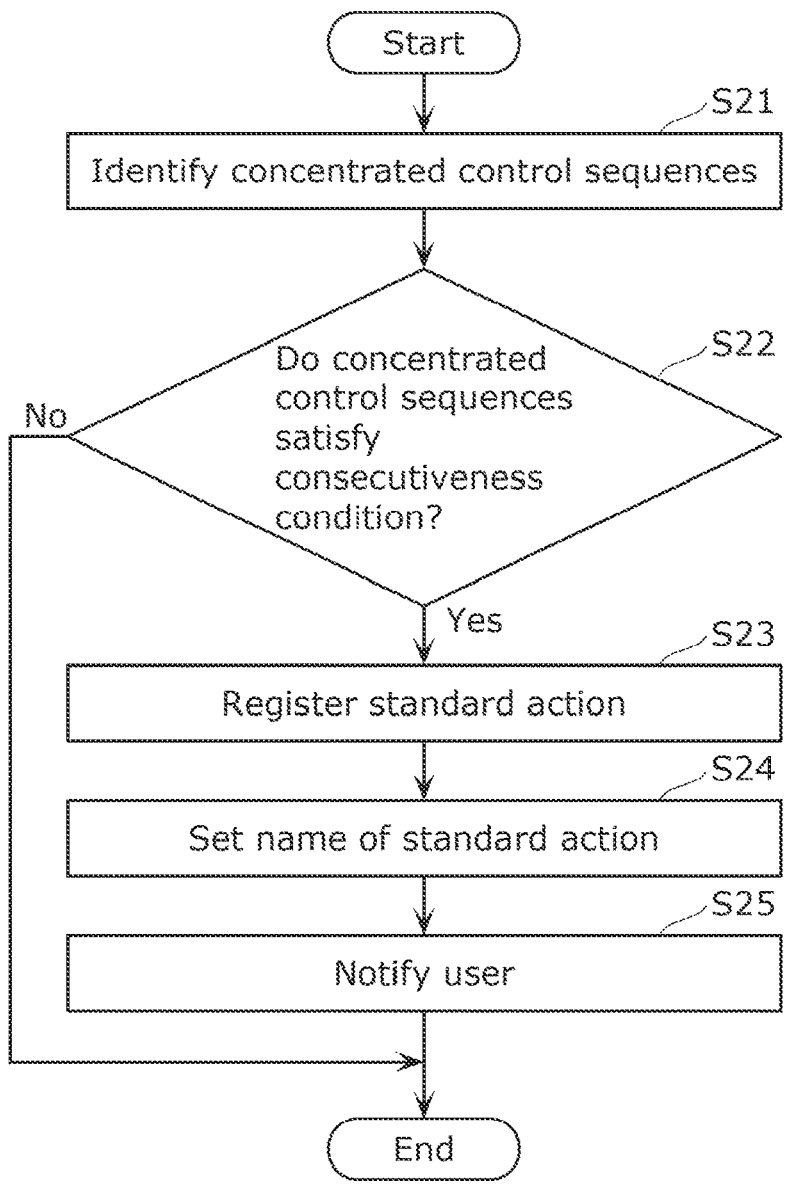

FIG. 6

| Condition | Name candidate |
|---|---|
| Time slot falls within 4:00 - 11:00. | Morning mode |
| Time slot falls within 3:00 - 09:00. | Good-morning mode |
| Time slot falls within 12:00 - 14:00. | Early afternoon mode |
| Time slot falls within 14:00 - 16:00. | Afternoon mode |
| Time slot falls within 16:00 - 18:00. | Twilight mode |
| Time slot falls within 16:00 - 21:00. | Evening mode |
| Time slot falls within 21:00 - 24:00. | Good-night mode |
| Target devices include cooking device. | Cooking mode |
| Control includes water filling with hot-water supply system. | Bath mode |
| Control includes unlocking electric lock. | Return-home mode |
| Control includes turning off exterior lighting. | Morning mode |
| Control includes turning on exterior lighting. | Evening mode |
|  |  |

FIG. 8

| Sending time | Target device | Content of control |
|---|---|---|
| 2019/4/8 18:05 | Electric lock | Unlock |
| 2019/4/8 18:09 | Lighting | Turn on |
| 2019/4/8 18:13 | Air conditioner | Turn on |
| 2019/4/8 18:15 | Exterior lighting | Turn off |
| 2019/4/8 18:16 | Electric shutter | Open |
| | | |
| 2019/4/9 10:06 | Electric lock | Unlock |
| 2019/4/9 10:08 | Air conditioner | Turn on |
| 2019/4/9 10:11 | Lighting | Turn on |
| 2019/4/9 10:12 | Electric shutter | Open |
| | | |
| 2019/4/10 20:04 | Electric lock | Unlock |
| 2019/4/10 20:08 | Lighting | Turn on |
| 2019/4/10 20:12 | Air conditioner | Turn on |
| 2019/4/10 20:13 | Electric shutter | Open |
| | | |
| | | |

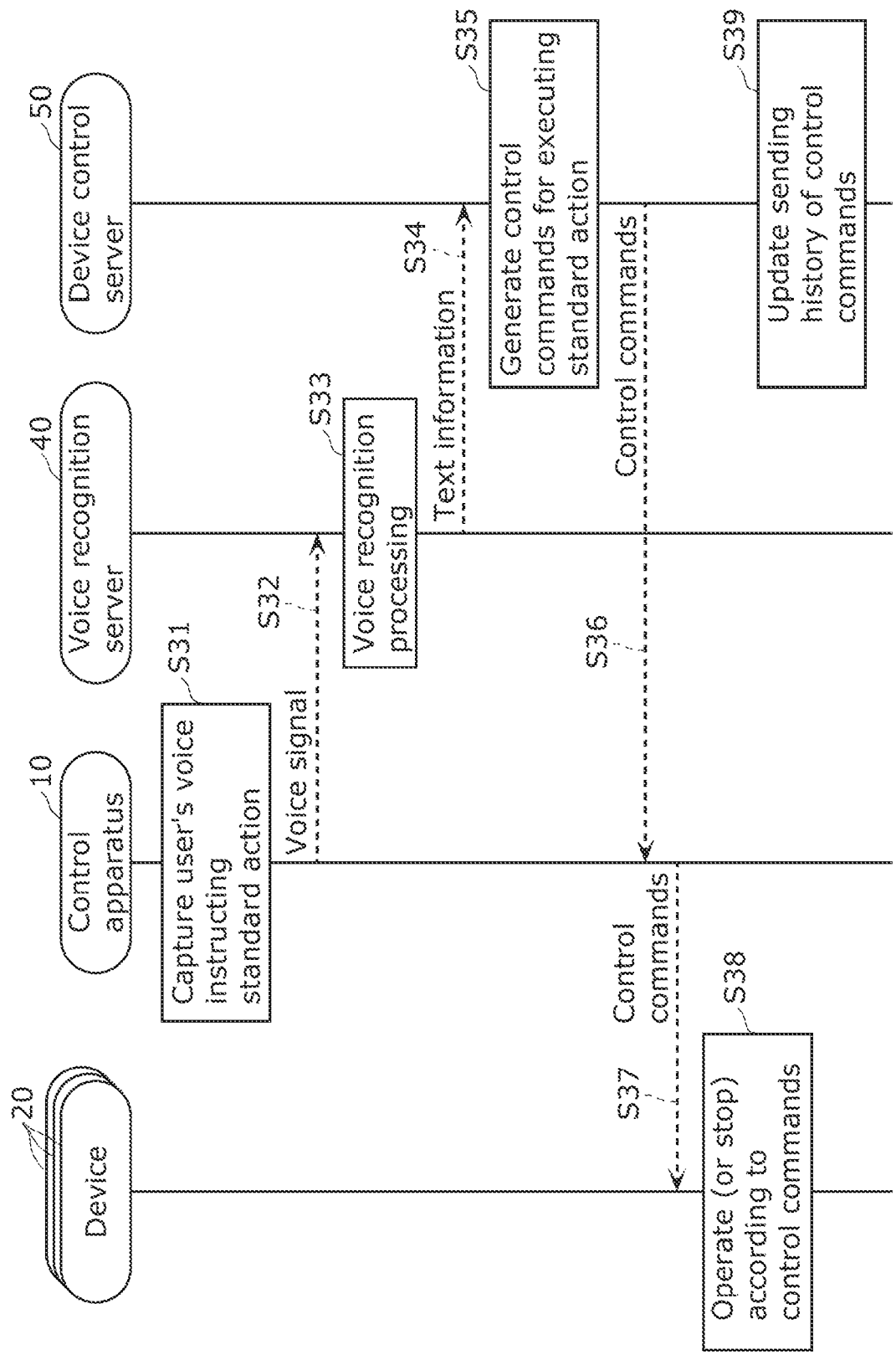

FIG. 10

| Sending time | Target device | Content of control | Note |
|---|---|---|---|
| 2019/4/11 8:05 | Lighting | Turn on | Standard action "good-morning mode" |
| 2019/4/11 8:05 | Air conditioner | Turn on | |
| 2019/4/11 8:05 | Electric shutter | Open | |
| 2019/4/11 8:07 | Air conditioner | Change set temperature to 27°C | |
| 2019/4/12 8:10 | Lighting | Turn on | Standard action "good-morning mode" |
| 2019/4/12 8:10 | Air conditioner | Turn on | |
| 2019/4/12 8:10 | Electric shutter | Open | |
| 2019/4/12 8:13 | Air conditioner | Change set temperature to 27°C | |
| 2019/4/13 8:08 | Lighting | Turn on | Standard action "good-morning mode" |
| 2019/4/13 8:08 | Air conditioner | Turn on | |
| 2019/4/13 8:08 | Electric shutter | Open | |
| 2019/4/13 8:12 | Air conditioner | Change set temperature to 27°C | |

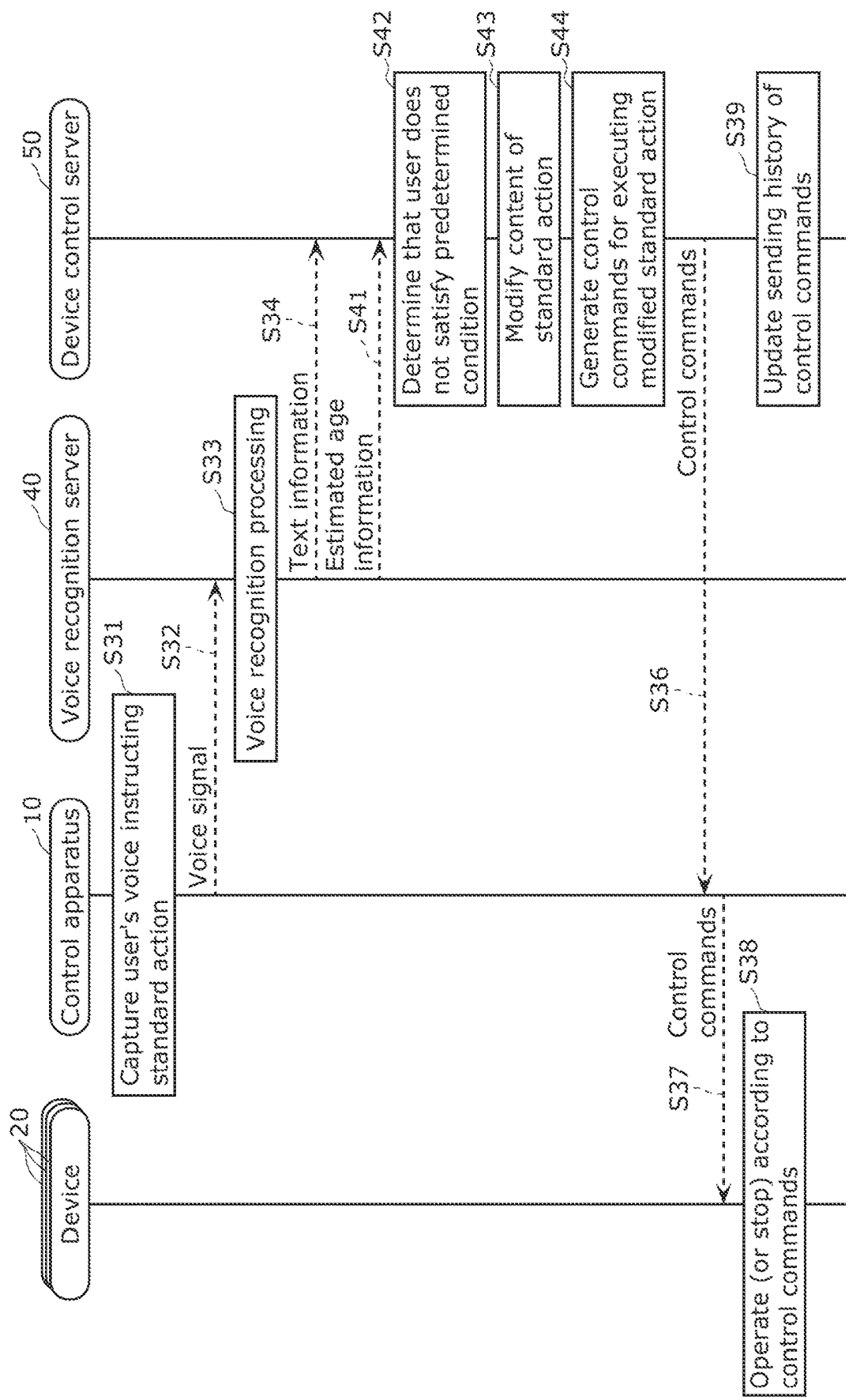

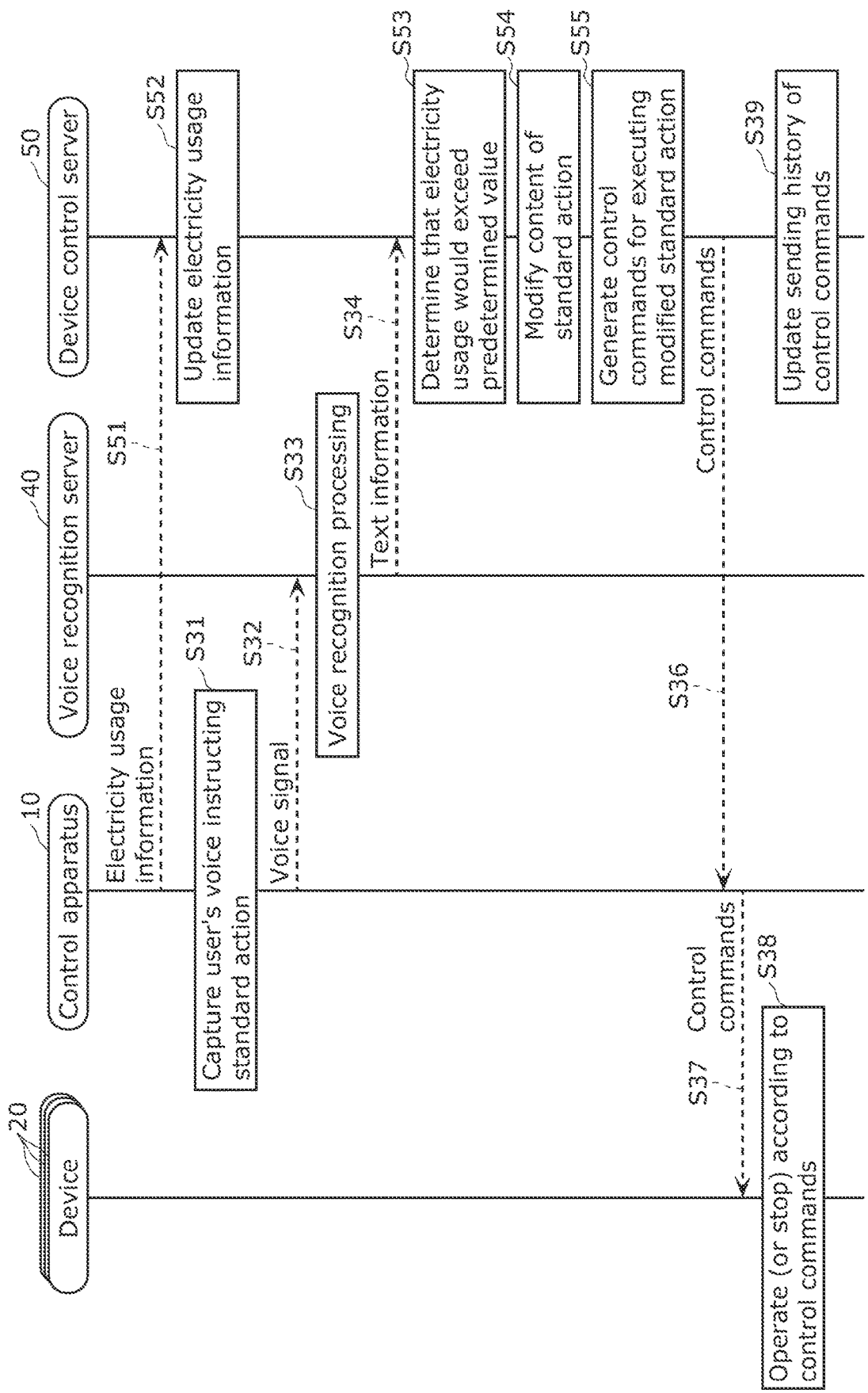

FIG. 14

| Sending time | Target device | Content of control | Note |
|---|---|---|---|
| 2019/4/11 8:05 | Lighting | Turn on | Standard action "good-morning mode" |
| 2019/4/11 8:05 | Air conditioner | Turn on | |
| 2019/4/11 8:05 | Electric shutter | Open | |
| 2019/4/11 8:07 | Exterior lighting | Turn off | |
| 2019/4/12 8:10 | Lighting | Turn on | Standard action "good-morning mode" |
| 2019/4/12 8:10 | Air conditioner | Turn on | |
| 2019/4/12 8:10 | Electric shutter | Open | |
| 2019/4/12 8:13 | Exterior lighting | Turn off | |
| 2019/4/13 8:08 | Lighting | Turn on | Standard action "good-morning mode" |
| 2019/4/13 8:08 | Air conditioner | Turn on | |
| 2019/4/13 8:08 | Electric shutter | Open | |
| 2019/4/13 8:12 | Exterior lighting | Turn off | |

FIG. 15

| Sending time | Target device | Content of control | Note |
|---|---|---|---|
| 2019/4/11 8:05 | Lighting | Turn on | Standard action "good-morning mode" |
| 2019/4/11 8:05 | Air conditioner | Turn on | |
| 2019/4/11 8:05 | Electric shutter | Open | |
| 2019/4/11 8:07 | Air conditioner | Turn off | |
| 2019/4/12 8:10 | Lighting | Turn on | Standard action "good-morning mode" |
| 2019/4/12 8:10 | Air conditioner | Turn on | |
| 2019/4/12 8:10 | Electric shutter | Open | |
| 2019/4/12 8:13 | Air conditioner | Turn off | |
| 2019/4/13 8:08 | Lighting | Turn on | Standard action "good-morning mode" |
| 2019/4/13 8:08 | Air conditioner | Turn on | |
| 2019/4/13 8:08 | Electric shutter | Open | |
| 2019/4/13 8:12 | Air conditioner | Turn off | |

CONTROL SYSTEM AND CONTROL METHOD

TECHNICAL FIELD

The present invention relates to a control system and a control method.

BACKGROUND ART

Various techniques related to control on devices installed in a building such as a house have been proposed. For example, Patent Literature (PTL) 1 discloses a device control apparatus having modes, such as leave-home mode, return-home mode, and wakeup mode, that enable collectively controlling home appliances.

CITATION LIST

Patent Literature

[PTL 1] Japanese Unexamined Patent Application Publication No. 2012-175377

SUMMARY OF INVENTION

Technical Problem

Collectively controlling home appliances as described in PTL 1 typically requires a user to preregister how the home appliances are to be collectively controlled.

The present disclosure provides a control system and a control method capable of automatically registering a standard action for collectively controlling devices.

Solution to Problem

A control system according to an aspect of the present invention includes: a communication unit that sends, to each of a plurality of devices, a control command for controlling the device; a registration unit that registers a standard action for collectively controlling at least two devices included in the plurality of devices, based on device control consecutiveness which is determined by control history information of the plurality of devices; and an executor that causes the communication unit to send a control command to each of the at least two devices when execution of the standard action registered is instructed.

A control method according to an aspect of the present invention includes: sending, to each of a plurality of devices, a control command for controlling the device; registering a standard action for collectively controlling at least two devices included in the plurality of devices, based on device control consecutiveness which is determined by control history information of the plurality of devices; and sending a control command to each of the at least two devices when execution of the standard action registered is instructed.

Advantageous Effects of Invention

A control system and a control method according to an aspect of the present disclosure are capable of automatically registering a standard action for collectively controlling devices.

BRIEF DESCRIPTION OF DRAWINGS

FIG. 3 is a diagram illustrating an example of sending history information on control commands.

FIG. 4 is a flowchart of operations of registering a standard action.

FIG. 5 is a diagram illustrating an example of registered information indicating a registered standard action.

FIG. 6 is a diagram illustrating an example of name candidate information.

FIG. 8 is a diagram illustrating another example of sending history information.

FIG. 9 is a sequence diagram of operation example 1 of executing a standard action in a control system according to an embodiment.

FIG. 10 is a diagram illustrating an example of sending history information including a standard action execution history.

FIG. 11 is a sequence diagram of operation example 2 of executing a standard action in a control system according to an embodiment.

FIG. 12 is a sequence diagram of operation example 3 of executing a standard action in a control system according to an embodiment.

FIG. 14 is a diagram illustrating another example of sending history information including a standard action execution history.

FIG. 15 is a diagram illustrating yet another example of sending history information including a standard action execution history.

DESCRIPTION OF EMBODIMENTS

Hereinafter, embodiments will be described in detail with reference to the Drawings. It should be noted that each of the embodiments described below shows a general or specific example. The numerical values, shapes, materials, structural components, the arrangement and connection of the structural components, steps, the processing order of the steps, etc., shown in the following embodiments are mere examples, and therefore do not limit the scope of the present invention. Therefore, among the structural components in the following embodiments, those not recited in any one of the independent claims are described as optional structural components.

It should be noted that the respective figures are schematic diagrams and are not necessarily precise illustrations. Furthermore, in the figures, structural components that are substantially the same are assigned the same reference sign, and overlapping description may be omitted or simplified.

Embodiment

Configuration of Control System

Figure 1:
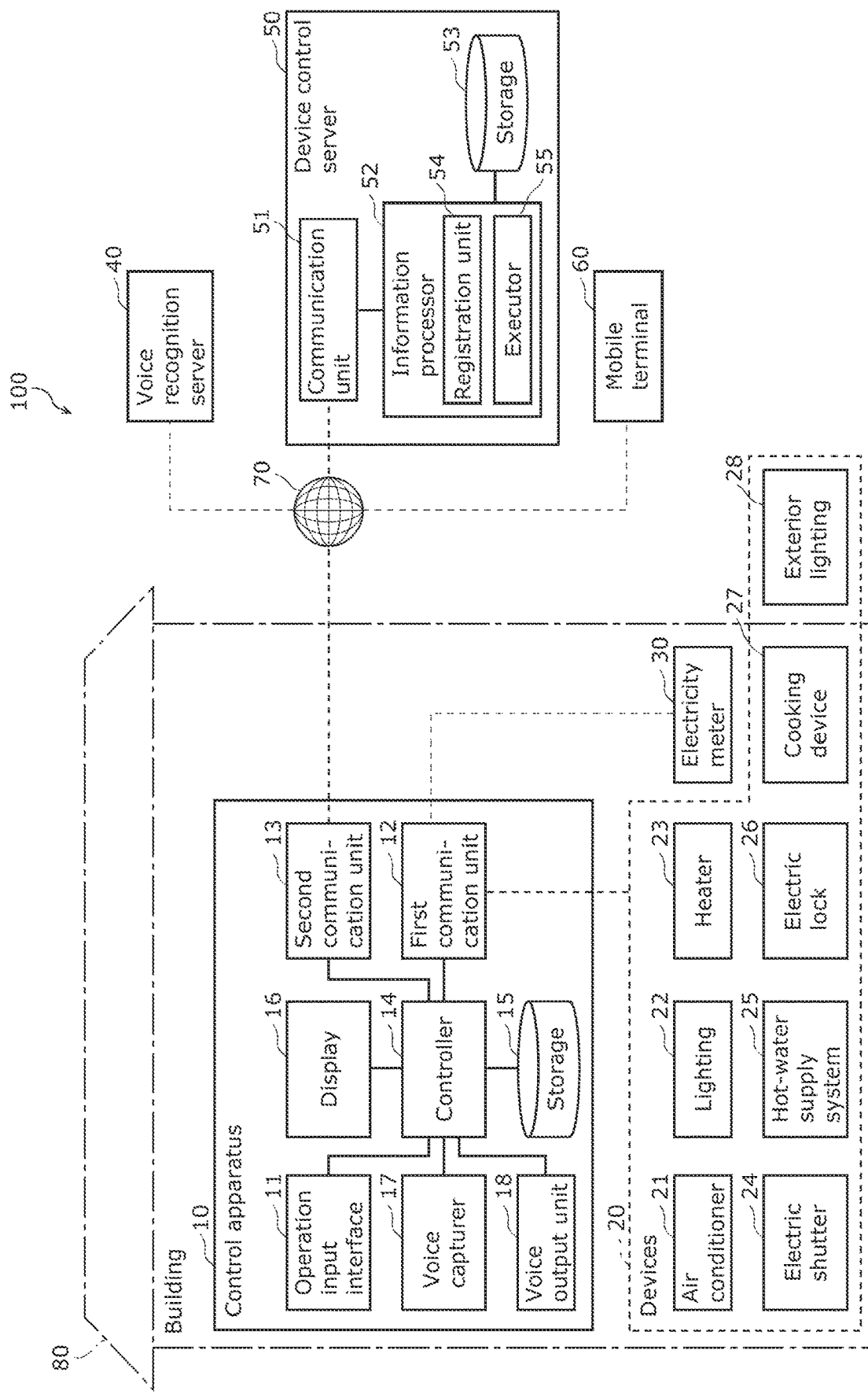
FIG. 1 is a block diagram illustrating a functional configuration of a control system according to an embodiment

First, the configuration of a control system according to an embodiment will be described. FIG. 1 is a block diagram illustrating the functional configuration of the control system according to the embodiment.

Control system 100 according to the embodiment is a system capable of controlling multiple devices 20 according to voice uttered by user U. Control system 100 is thus a voice-based device control system. As shown in FIG. 1, control system 100 includes control apparatus 10, devices 20, electricity meter 30, voice recognition server 40, device control server 50, and mobile terminal 60. Each of these components will be described below.

First, control apparatus 10 will be described. Control apparatus 10 is, for example, a home energy management system (HEMS) controller having energy management functions. Located in building 80, control apparatus 10 manages the amount of electricity used (in other words, the amount of power consumed) by devices 20 installed in building 80. Control apparatus 10 also controls, according to the user's voice, devices 20 installed in building 80 or in the grounds of building 80. Control apparatus 10 is not limited to a HEMS controller but may be some other home controller or gateway apparatus without energy management functions.

Specifically, control apparatus 10 includes operation input interface 11, first communication unit 12, second communication unit 13, controller 14, storage 15, display 16, voice capturer 17, and voice output unit 18.

Operation input interface 11 is a user interface device that receives hand-inputted operation inputs (hereinafter also referred to simply as operation inputs) of the user. Operation input interface 11 is implemented as a touch panel, for example, but may be implemented as hardware keys such as push buttons.

First communication unit 12 is a communication module (communication circuit) for control apparatus 10 to communicate with components such as devices 20 and electricity meter 30 over a local area communication network. First communication unit 12 is a wireless communication circuit for performing wireless communication, for example, but may be a wired communication circuit for performing wired communication. First communication unit 12 communicates according to a communication standard such as, for example but not limited to, ECHONET Lite®. First communication unit 12 may communicate according to different communication standards for different devices.

Second communication unit 13 is a communication circuit for control apparatus 10 to communicate with components such as voice recognition server 40 and device control server 50 over wide area communication network 70 such as the Internet. Second communication unit 13 is a wireless communication circuit for performing wireless communication, for example, but may be a wired communication circuit for performing wired communication. Second communication unit 13 may communicate according to any communication standard.

Controller 14 performs control related to control apparatus 10. Controller 14 is implemented as a microcomputer, for example, but may be implemented as a processor or a special-purpose circuit.

Storage 15 is a storage device that stores items such as control programs executed by controller 14. Storage 15 is implemented as semiconductor memory, for example.

Display 16 displays images based on control performed by controller 14. Display 16 is implemented as a display panel, for example a liquid crystal panel or an organic electroluminescent (EL) panel.

Voice capturer 17 captures the user's voice. Voice capturer 17 is implemented as a microphone, for example.

Voice output unit 18 outputs voice and/or sound based on control performed by controller 14. Voice output unit 18 is implemented as a speaker, for example.

Devices 20 will now be described. Devices 20 are installed in building 80. Devices 20 are controlled according to control commands sent by first communication unit 12 in control apparatus 10. Devices 20 are target devices to be controlled in control system 100. Devices 20 includes air conditioner 21, lighting 22, heater 23, electric shutter 24, hot-water supply system 25, electric lock 26, cooking device 27 (such as a range hood or an IH cooking heater), and exterior lighting 28.

Electricity meter 30 will now be described. Electricity meter 30 measures electricity usage in building 80. The electricity usage measured by electricity meter 30 is managed by control apparatus 10. Electricity meter 30 is a distribution switchboard having the function of measuring the electricity usage for each branch circuit in building 80, but may be what is called a smart meter.

Voice recognition server 40 will now be described. Voice recognition server 40 is a cloud server that performs voice recognition processing for a voice signal received from control apparatus 10. A provider of a voice recognition service uses voice recognition server 40 to provide the voice recognition service. For example, voice recognition server 40 converts a voice signal received from control apparatus 10 into text information and sends the text information to device control server 50.

Device control server 50 will now be described. Device control server 50 is a cloud server that generates control commands based on the text information received from the voice recognition server and sends the generated control commands to control apparatus 10. The control commands are received by devices 20 via control apparatus 10. Device control server 50 includes communication unit 51, information processor 52, and storage 53.

Communication unit 51 is a communication module (communication circuit) for device control server 50 to communicate with components such as control apparatus 10, voice recognition server 40, and mobile terminal 60 over wide area communication network 70 such as the Internet. Communication unit 51 communicates through wire, for example, but may communicate wirelessly. Communication unit 51 may communicate according to any communication standard.

Information processor 52 performs information processing related to control on devices 20. Information processor 52 is implemented as a microcomputer, for example, but may be implemented as a processor. Information processor 52 includes registration unit 54 and executor 55.

Storage 53 is a storage device that stores sending history information on control commands, control programs executed by information processor 52, and other items. Storage 53 is implemented as a hard disk drive (HDD), for example.

Mobile terminal 60 will now be described. Mobile terminal 60 may specifically be a smartphone or a tablet terminal. Mobile terminal 60 may be carried by a user living in building 80 or by a user living away from building 80.

Basic Operations

Figure 2:
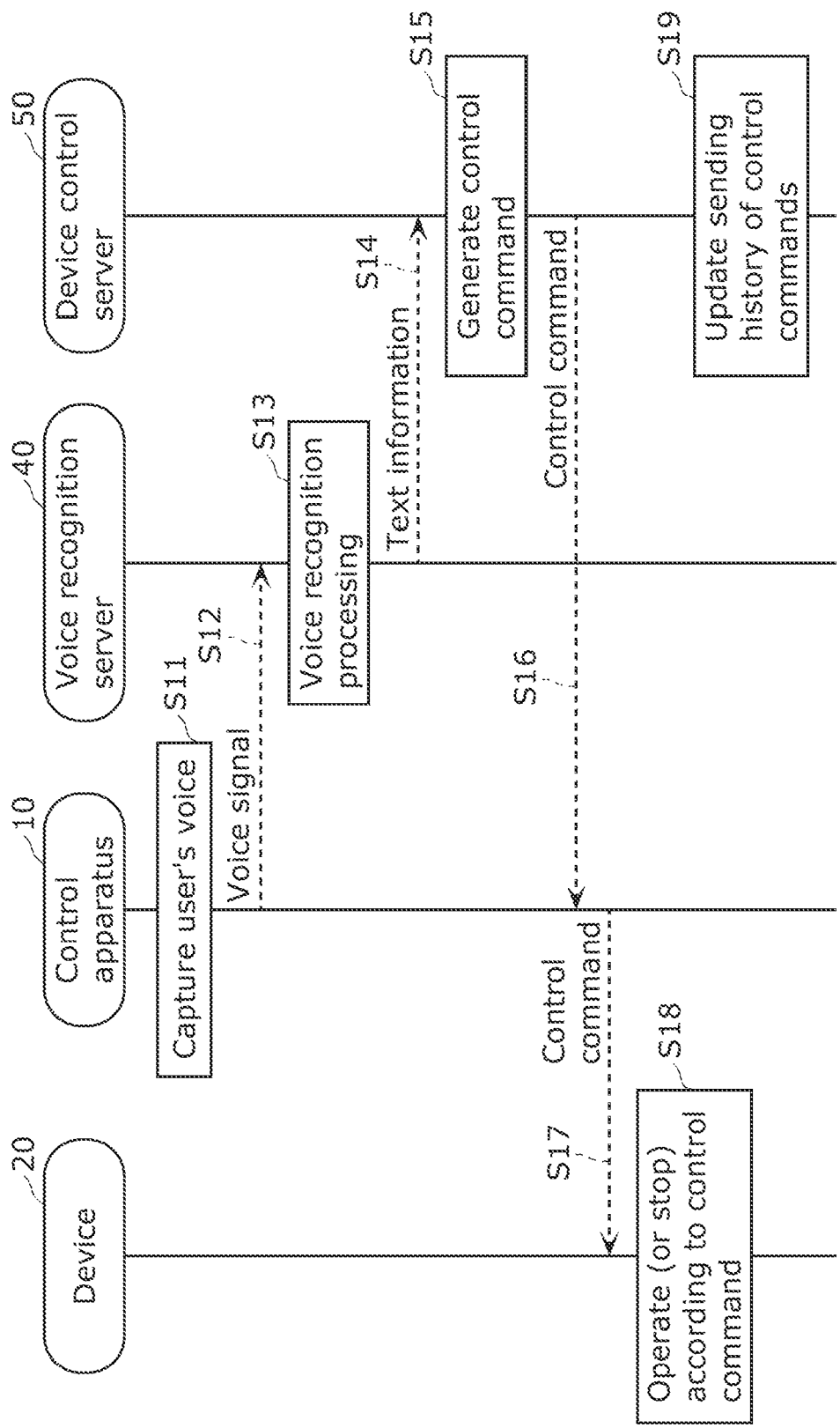
FIG. 2 is a sequence diagram of basic operations of a control system according to an embodiment.

Basic operations of control system 100 will now be described. FIG. 2 is a sequence diagram of the basic operations of control system 100.

In response to the user uttering a voice intended to control a device, voice capturer 17 in control apparatus 10 captures the voice (S11). Controller 14 causes second communication unit 13 to send a voice signal of the captured voice to voice recognition server 40 (S12).

Voice recognition server 40 receives the voice signal and performs voice recognition processing (S13). Specifically, voice recognition server 40 converts the received voice signal into text information and sends the text information to device control server 50 (S14).

Communication unit 51 in device control server 50 receives the text information from voice recognition server 40. Based on the text information received by communication unit 51, information processor 52 generates a control command (S15). For example, if the text information indicates text "Turn on the air conditioner," information processor 52 generates a control command for turning on air conditioner 21. Information processor 52 causes communication unit 51 to send the generated control command to control apparatus 10 (S16).

Second communication unit 13 in control apparatus 10 receives the control command from device control server 50. Controller 14 causes first communication unit 12 to send the received control command to device 20 (in this case, air conditioner 21) (S17). Device 20 receives the control command and operates (or stops) according to the control command (S18).

Meanwhile, after the control command is sent from device control server 50 to control apparatus 10, information processor 52 in device control server 50 updates the sending history information on control commands in storage 53 (S19). FIG. 3 is a diagram illustrating an example of the sending history information on control commands. As shown in FIG. 3, the sending history information includes the sending time of each control command, the target device of the control command, and the content of control, which are associated with each other.

As described above, control system 100 can control device 20 by sending a control command according to the user's voice.

Operations of Registering Standard Action

Based on the sending history information as in FIG. 3, control system 100 can register a standard action for collectively operating two or more of devices 20. Operations of registering the standard action will be described below. FIG. 4 is a flowchart of the operations of registering the standard action. The standard action may also be referred to as scene control or a routine.

Based on the sending history information on control commands in storage 53, registration unit 54 in device control server 50 identifies concentrated control in which two or more devices are sequentially controlled at time intervals less than a specific period (e.g., five minutes) (S21). In the example in FIG. 3, three sequences of concentrated control A to C are identified.

Registration unit 54 determines whether the identified concentrated control sequences satisfy a consecutiveness condition (S22). Specifically, registration unit 54 determines whether the concentrated control sequences A to C were performed in the same time slot on at least a predetermined number of consecutive days (e.g., three consecutive days) and further the concentrated control sequences A to C all have the same set of two or more control operations performed on at least the predetermined number of consecutive days. In the example in FIG. 3, three control operations, i.e., the control of turning on air conditioner 21, the control of turning on lighting 22, and the control of opening electric shutter 24, were performed in the time slot from 8:00 to 9:00 on three consecutive days. The concentrated control sequences A to C thus satisfy the condition that they were performed in the same time slot on at least a predetermined number of consecutive days and they all have the same set of two or more control operations performed on at least the predetermined number of consecutive days.

If registration unit 54 determines that the identified concentrated control sequences A to C do not satisfy the consecutiveness condition (No at S22), the process terminates. If registration unit 54 determines that the identified concentrated control sequences A to C satisfy the consecutiveness condition (Yes at S22), registration unit 54 registers a standard action for collectively performing the control operations performed in all of the concentrated control sequences A to C on at least the predetermined number of consecutive days (S23). FIG. 5 is a diagram illustrating an example of registered information indicating the registered standard action. As shown in FIG. 5, executing the standard action registered based on the sending history information as in FIG. 3 allows collectively performing the three control operations performed on all of at least the predetermined number of consecutive days, i.e., the control of turning on air conditioner 21, the control of turning on lighting 22, and the control of opening electric shutter 24.

As shown in FIG. 5, the standard action is assigned a name. That is, registration unit 54 sets the name of the standard action (S24). Specifically, registration unit 54 refers to name candidate information stored in advance in storage 53 and sets, as the name of the standard action, a name associated with the time slot in which the concentrated control sequences were performed. FIG. 6 is a diagram illustrating an example of the name candidate information.

In the example in FIG. 6, the time slot from 8:00 to 9:00 in which the concentrated control sequences were performed has two modes associated therewith: "good-morning mode" and "morning mode". Registration unit 54 therefore sets either "good-morning mode" or "morning mode" as the name of the standard action. At this point, registration unit 54 may ask the user which name to set. For this purpose, registration unit 54 may cause communication unit 51 to send inquiry information to control apparatus 10, which may then ask the user which name to employ by displaying video on display 16 of control apparatus 10 or by outputting voice from voice output unit 18. The answer to the inquiry can be identified from the user's operation input to operation input interface 11 or from the user's voice input to voice capturer 17.

The name of the standard action may also be set based on the type of a device to be controlled in the standard action. For example, the name of the standard action may be set based on whether the devices to be controlled in the standard action includes a particular device. In the example in FIG. 6, if the devices to be controlled in the standard action includes cooking device 27, the name "cooking mode" may be set.

The name of the standard action may also be set based on whether the control involved in the standard action includes a particular control operation on a particular device. In the example in FIG. 6, if the control involved in the standard action includes the control of filling a bathtub with hot water by hot-water supply system 25, the name "bath mode" may be set. If the control involved in the standard action includes the control of unlocking electric lock 26, the name "return-home mode" may be set. If the control involved in the standard action includes the control of turning off exterior lighting 28, the name "morning mode" may be set. If the control involved in the standard action includes the control of turning on exterior lighting 28, the name "evening mode" may be set.

Figure 7:
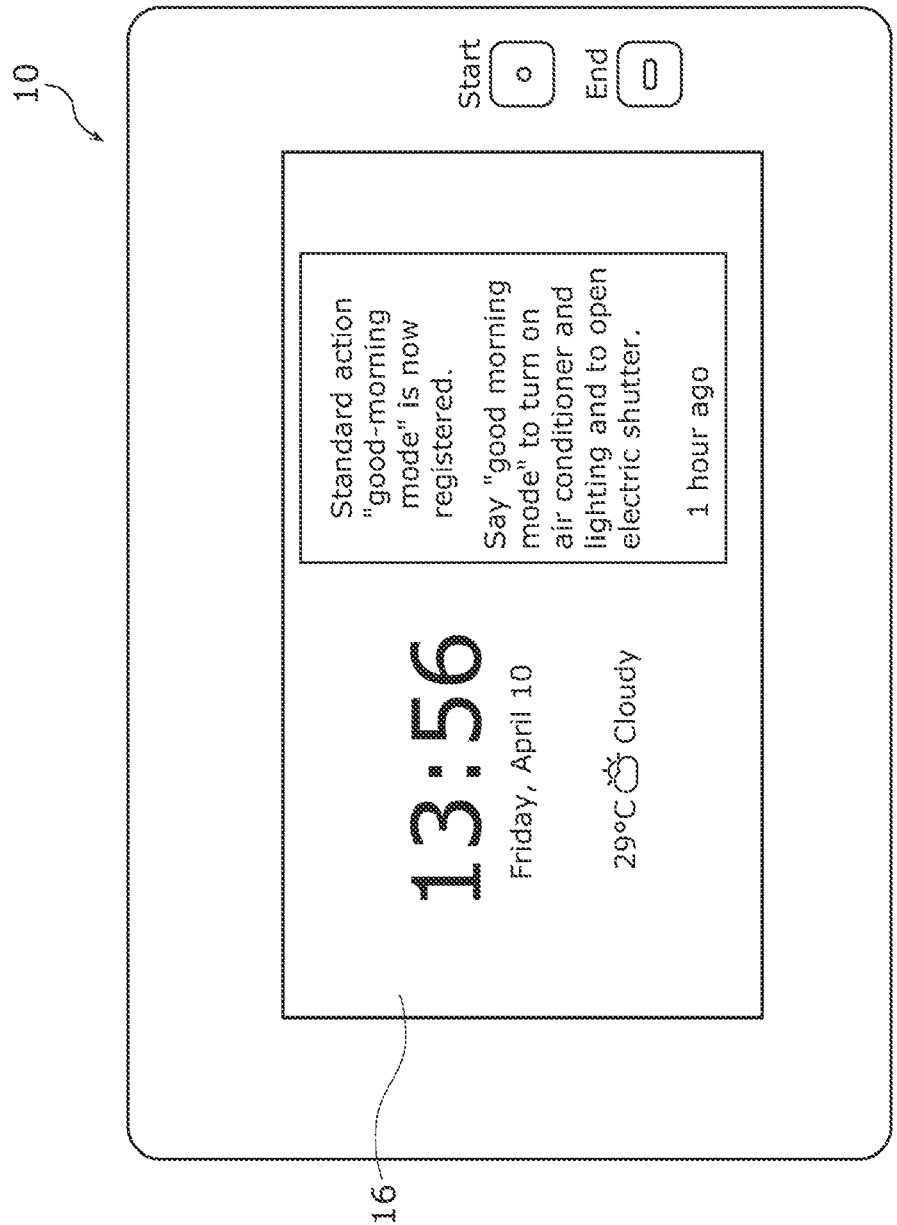
FIG. 7 is a diagram illustrating an example of a notification screen for providing a notification of completion of a standard action registration.

Registration unit 54 notifies the user of the completion of the standard action registration and the name of the registered standard action (S25). Specifically, registration unit 54 causes communication unit 51 to send notification information to control apparatus 10. Control apparatus 10 receives the notification information and causes display 16 to display a notification screen as in FIG. 7. FIG. 7 is a diagram illustrating an example of the notification screen for providing a notification of the completion of the standard action registration. Control apparatus 10 may also cause voice output unit 18 to output voice to notify the user of the completion of the standard action registration and the name of the registered standard action.

As described above, control system 100 can automatically register the standard action based on sending history information of control commands, without receiving operation input or voice input aimed at registering the standard action from the user.

One of the determining factors in the above standard action registration is whether the concentrated control sequences were performed in the same time slot on at least a predetermined number of consecutive days. However, the time slot does not need to be used as a determining factor. For example, registration unit 54 may register the standard action based on the control sequences irrespective of time slots. FIG. 8 is a diagram illustrating another example of the sending history information on control commands.

In the example in FIG. 8, the control of unlocking electric lock 26 on each of three consecutive days was followed by three sequential control operations: the control of turning on lighting 22, the control of turning on air conditioner 21, and the control of opening electric shutter 24. However, the sequences of these three control operations were performed in different time slots on the respective days. In this case, registration unit 54 may register, irrespective of the time slots in which the control operations were performed, a standard action for collectively performing the control of turning on lighting 22, the control of turning on air conditioner 21, and the control of opening electric shutter 24.

Operation Example 1 of Executing Standard Action

Now, operation example 1 of executing the standard action in control system 100 will be described. FIG. 9 is a sequence diagram of operation example 1 of executing the standard action in control system 100.

In response to the user uttering a voice instructing to execute the standard action, voice capturer 17 in control apparatus 10 captures the voice (S31). For example, the user says "Good-morning mode," which is then captured by voice capturer 17. Controller 14 causes second communication unit 13 to send a voice signal of the captured voice to voice recognition server 40 (S32).

Voice recognition server 40 receives the voice signal and performs voice recognition processing (S33). Specifically, voice recognition server 40 converts the received voice signal into text information and sends the text information to device control server 50 (S34).

Communication unit 51 in device control server 50 receives the text information from voice recognition server 40. Based on the text information received by communication unit 51, executor 55 generates control commands for executing the standard action (S35). For example, if the standard action is "good-morning mode," executor 55 generates a control command for turning on air conditioner 21, a control command for turning on lighting 22, and a control command for opening electric shutter 24. Executor 55 causes communication unit 51 to send the generated control commands to control apparatus 10 (S36).

Second communication unit 13 in control apparatus 10 receives the control commands from device control server 50. Controller 14 causes first communication unit 12 to send the received control commands to devices 20 (in this case, air conditioner 21, lighting 22, and electric shutter 24) (S37). Devices 20 receive the respective control commands and operate (or stop) according to the control commands (S38).

Meanwhile, after the control commands are sent from device control server 50 to control apparatus 10, executor 55 in device control server 50 updates the sending history information on control commands in storage 53 (S39). FIG. 10 is a diagram illustrating an example of the sending history information on control commands including a standard action execution history.

As described above, control system 100 can use the standard action to collectively control two or more devices. In the foregoing basic operations, controlling two or more devices requires sending two or more voice signals from control apparatus 10 to voice recognition server 40. By contrast, the standard action enables controlling two or more devices by sending a single voice signal.

This can reduce voice-signal data traffic.

Operation Example 2 of Executing Standard Action

Control system 100 may execute the standard action after modifying the content of the standard action according to the utterer of the voice. Operation example 2 of executing the standard action in such a case will be described below. FIG. 11 is a sequence diagram of operation example 2 of executing the standard action in control system 100.

Processing at steps S31 to S34 is the same as in operation example 1. After step S34, voice recognition server 40 estimates, based on the voice signal, the age of the user who has uttered the voice instructing to execute the standard action. Voice recognition server 40 sends estimated age information indicating the user's estimated age to device control server 50 (S41).

Communication unit 51 in device control server 50 receives the text information and the estimated age information from voice recognition server 40. Based on the estimated age information, executor 55 determines whether the standard action determined from the text information can be executed without modification. For example, if the user is a child, it may be unpreferable, from the viewpoint of safety, to operate a heat-generating device such as heater 23, or a rotationally driven device such as a dryer (not shown).

As such, if the age indicated by the estimated age information is less than or equal to a predetermined age (e.g., 12), executor 55 determines that the user does not satisfy a predetermined condition (in this case, the age condition) (S42). Executor 55 then modifies the content of the standard action (S43). Specifically, if the standard action involves control such as operating heater 23 or a dryer, executor 55 excludes such control from the operations to be performed. If the standard action does not involve such control, there are cases where the content of the standard action is not modified even if the user does not satisfy the predetermined condition. It is to be noted that the processing at step S43 does not modify the registered content of the standard action, but rather modifies, as an exception at the time of executing the standard action, the operations to be performed.

Executor 55 then generates control commands for executing the modified standard action (S44). Subsequent processing is the same as in operation example 1.

As described above, before executing the standard action, control system 100 can modify the content of the standard action in view of safety.

Although operation example 2 estimates the user's age based on the user's voice, this age estimation is merely exemplary. For example, control apparatus 10 may include a camera (not shown) to estimate the user's age based on the user's face image taken by the camera. In this case, the user's age is estimated by control apparatus 10, which then sends the estimated age information to device control server 50. Alternatively, control apparatus 10 may send the face image to device control server 50, which may then estimate the user's age based on the face image.

The basis for determining whether to modify the content of the standard action is not limited to whether the user satisfies the age condition. For example, whether to modify the content of the standard action may be determined based on whether information on the user's other attributes (such as sex) satisfies a predetermined condition.

In execution operation example 2, instead of modifying the content of the standard action, executor 55 may ask (confirm with) the user whether the user really wants to execute the standard action.

Operation Example 3 of Executing Standard Action

Control system 100 may execute the standard action after modifying the content of the standard action according to the electricity usage in building 80. Operation example 3 of executing the standard action in such a case will be described below. FIG. 12 is a sequence diagram of operation example 3 of executing the standard action in control system 100.

As mentioned above, control apparatus 10 manages electricity usage for each branch circuit (in other words, for each device 20) measured by electricity meter 30. Control apparatus 10 periodically sends, to device control server 50, electricity usage information indicating the amount of electricity used by each device 20 (S51). Once communication unit 51 in device control server 50 receives the electricity usage information, electricity usage information in storage 53 is updated (S52).

While device control server 50 manages the electricity usage in building 80 in the above manner, the processing at steps S31 to S34 is performed as in operation example 1. After step S34, based on the electricity usage information, executor 55 in device control server 50 determines whether executing, without modification, the standard action determined from the text information would cause the electricity usage in building 80 to exceed a predetermined value.

Specifically, executor 55 refers to the current electricity usage determined based on the latest electricity usage information, and an increase in the electricity usage expected to result from executing the standard action, determined based on the past electricity usage information. Executor 55 can then determine whether executing the standard action without modification would cause the electricity usage in building 80 to exceed a predetermined value. The predetermined value may be manually set by the user or may be determined based on a request to reduce the electricity usage (such as a demand response signal) provided from a server of an electric power company.

If executor 55 determines that the electricity usage would exceed the predetermined value (S53), executor 55 modifies the content of the standard action (S54). Specifically, executor 55 excludes at least one of the control operations involved in the standard action. Alternatively, executor 55 may modify the content of at least one of the control operations involved in the standard action (e.g., the set temperature of air conditioner 21) so that the electricity usage is reduced. Executor 55 then generates control commands for executing the modified standard action (S55). Subsequent processing is the same as in operation example 1.

As described above, before executing the standard action, control system 100 can modify the content of the standard action in view of the electricity usage.

Operations of Modifying Registered Content of Standard Action

Figure 13:
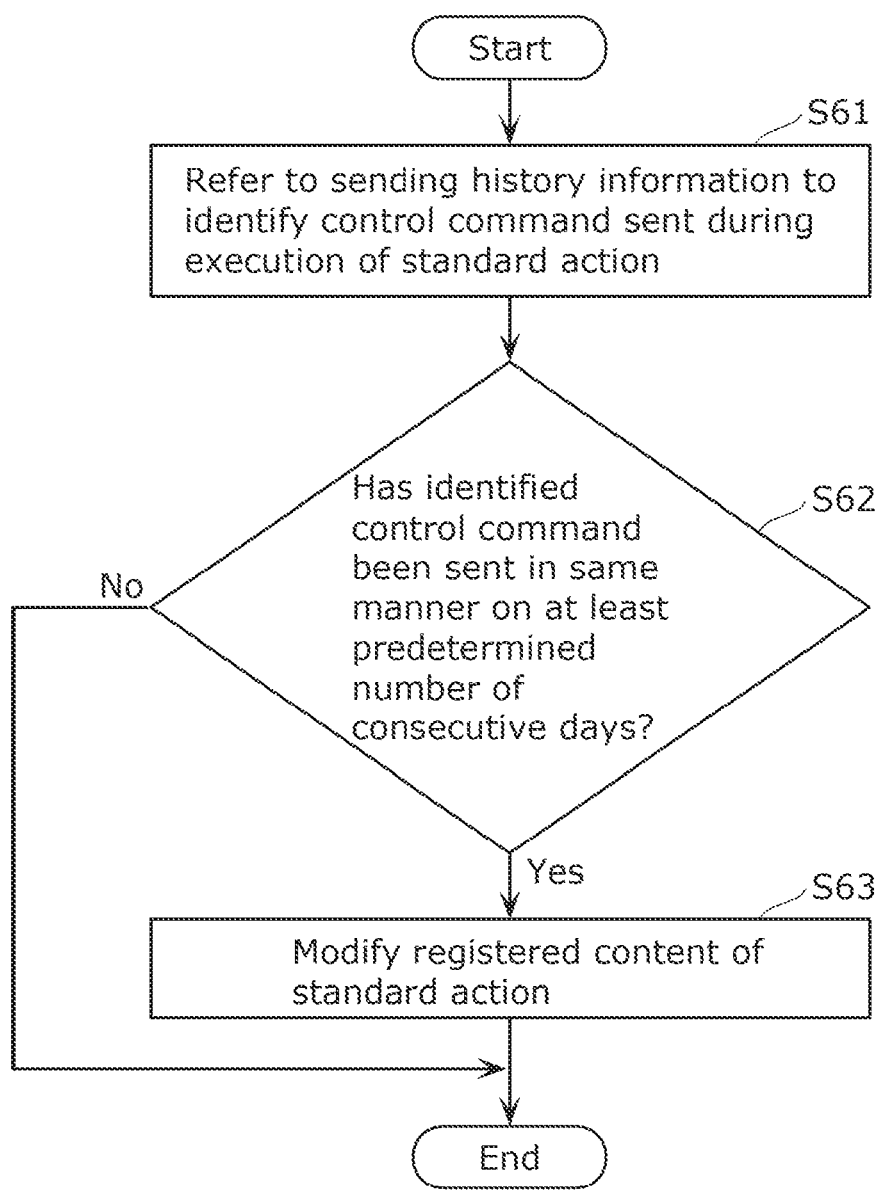
FIG. 13 is a flowchart of operations of modifying a registered content of a standard action.

The sending history information in FIG. 10 above indicates that the execution of the standard action "good-morning mode" is always followed by changing the set temperature of air conditioner 21. If, as in this case, a control command is sent during the execution of the standard action on at least a predetermined number of consecutive days, registration unit 54 may modify the registered content of the standard action based on that control command. FIG. 13 is a flowchart of operations of modifying the registered content of the standard action.

Registration unit 54 in device control server 50 refers to the sending history information in storage 53 to identify a control command sent during the execution of the standard action (S61). Registration unit 54 determines whether the identified control command has been sent in the same manner on at least a predetermined number of consecutive days (e.g., three consecutive days) (S62).

If registration unit 54 determines that the identified control command has not been sent in the same manner on at least the predetermined number of consecutive days (No at S62), registration unit 54 does not modify the registered content of the standard action. If registration unit 54 determines that the identified control command has been sent in the same manner on at least the predetermined number of consecutive days (Yes at S62), registration unit 54 modifies the registered content of the standard action (S63). That is, registration unit 54 rewrites the registered information (such as the one in FIG. 5) in storage 53.

For example, a change command may be sent during the execution of the standard action, as shown in FIG. 10. The change command is a control command for changing the set temperature of air conditioner 21 among the target devices of the standard action. In this case, at step S63, the set temperature in the control command to be sent to air conditioner 21 in response to an instruction to execute the standard action is changed from the default value to a temperature specified by the change command (27° C. in FIG. 10). Registration unit 54 thus modifies, based on the change command, the content of the control command to be sent to air conditioner 21 in response to an instruction to execute the standard action.

FIG. 14 is a diagram illustrating another example of the sending history information including the standard action execution history. The sending history information in FIG. 14 indicates that the execution of the standard action "good-morning mode" is always followed by turning on exterior lighting 28. In this case, at step S63, exterior lighting 28 is added to the devices to which control commands are to be sent in response to an instruction to execute the standard action.

FIG. 15 is a diagram illustrating yet another example of the sending history information including the standard action execution history. The sending history information in FIG. 15 indicates that the execution of the standard action "good-morning mode" is always followed by turning off air conditioner 21 turned on by the execution of the standard action. In this case, at step S63, air conditioner 21 is excluded from the devices to which control commands are to be sent in response to an instruction to execute the standard action.

As described above, control system 100 can automatically change the registered content of the standard action based on sending history information of control commands, without receiving operation input or voice input aimed at changing the registered content of the standard action from the user.

Operations for Standard Action not Executed as Usual

Figure 16:
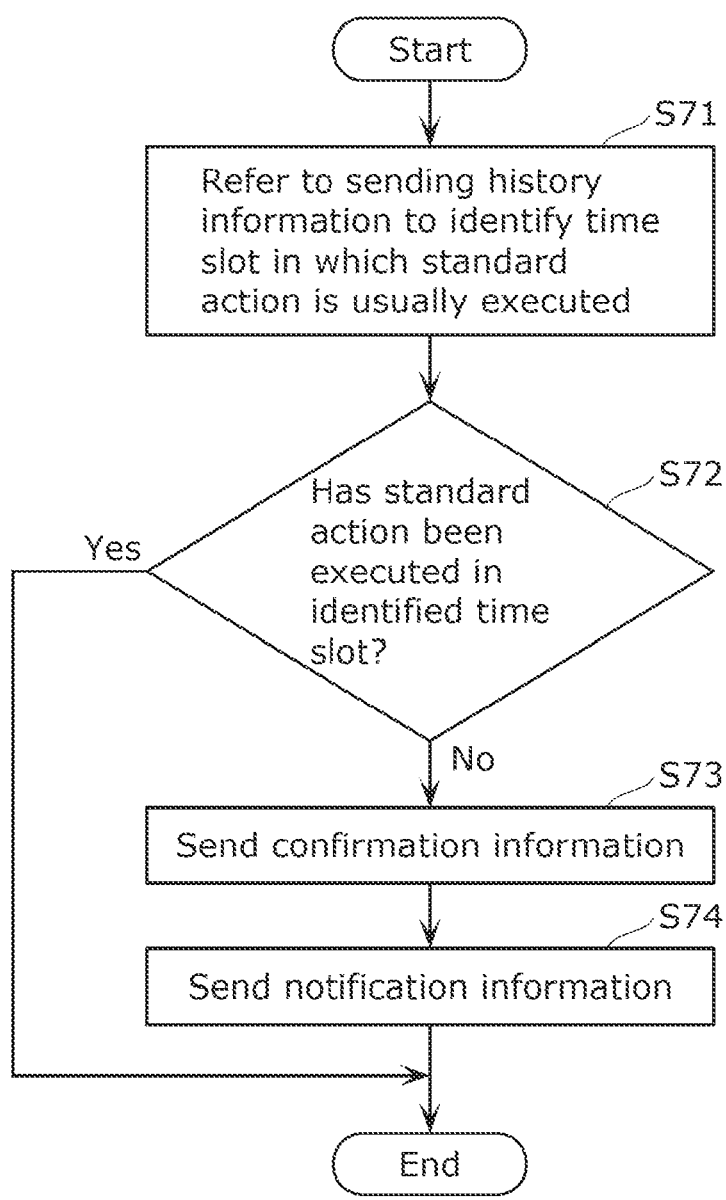
FIG. 16 is a flowchart of operations including processing performed when a standard action is not executed as usual.

The sending history information in FIG. 10 indicates that the standard action "good-morning mode" is executed in the same time slot every day. For such a routine standard action, further consideration may be given to processing that could be performed by control system 100 when the standard action is not executed as usual. Operations including such processing will be described below. FIG. 16 is a flowchart of operations including processing performed for the standard action not executed as usual.

Executor 55 in device control server 50 refers to the sending history information in storage 53 to identify the time slot in which the standard action was executed in the past (S71). Based on the sending history information as in FIG. 10, executor 55 can determine that the standard action was usually executed in the time slot from 8:00 to 8:30 in the past.

Executor 55 determines whether the standard action has been executed today in the time slot from 8:00 to 8:30 (i.e., the identified time slot) (S72).

Figure 17:
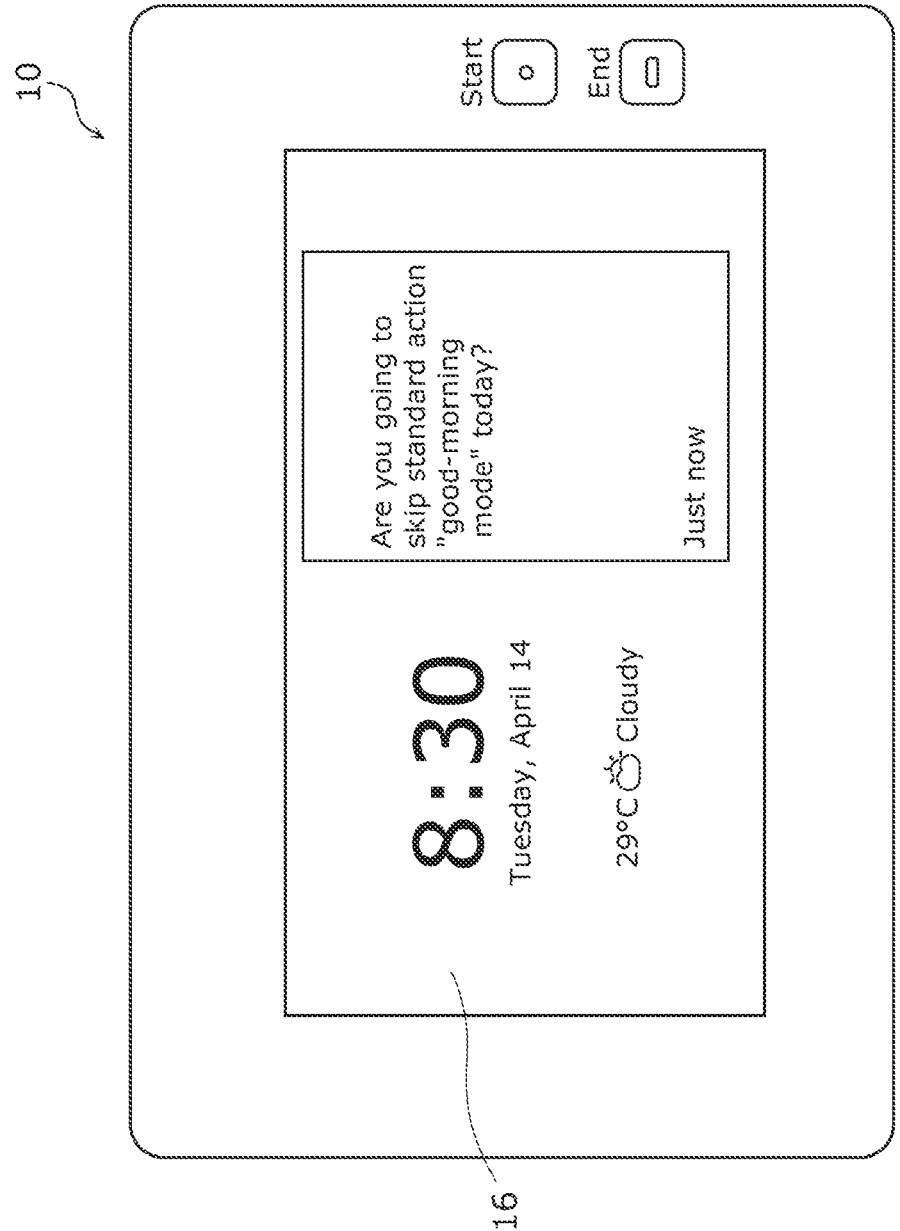
FIG. 17 is a diagram illustrating an example of a confirmation screen for confirming whether the standard action needs to be executed.

If executor 55 determines that the standard action has not been executed in the identified time slot (No at S72), executor 55 causes communication unit 51 to send confirmation information to control apparatus 10 (S73). The confirmation information is information for confirming whether the standard action needs to be executed. Control apparatus 10 receives the confirmation information and causes display 16 to display a confirmation screen for confirming whether the standard action needs to be executed. FIG. 17 is a diagram illustrating an example of the confirmation screen for confirming whether the standard action needs to be executed.

Figure 18:
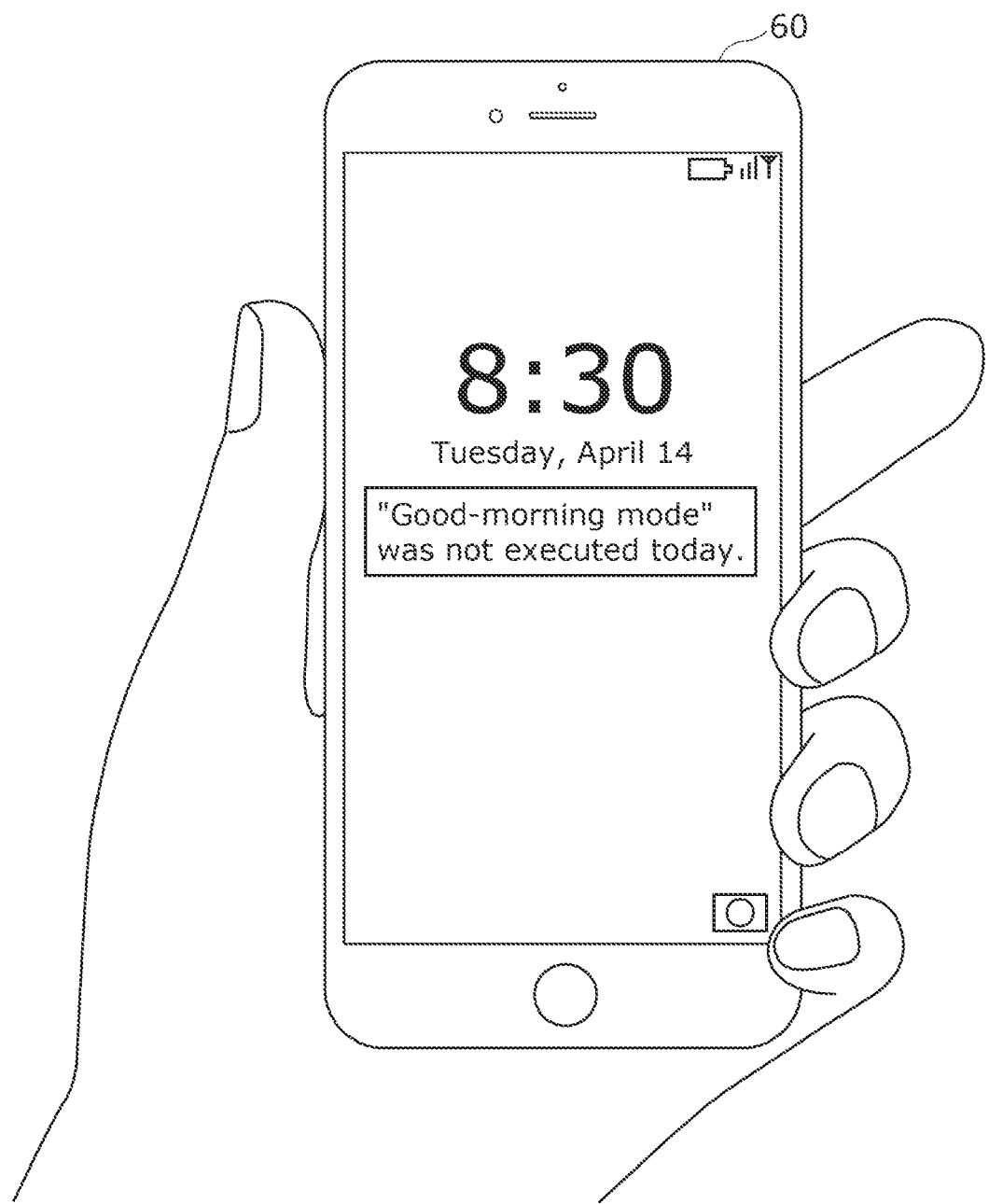
FIG. 18 is a diagram illustrating an example of the notification screen for providing a notification that the standard action was not executed.

Executor 55 then causes communication unit 51 to send notification information to mobile terminal 60 (S74). The notification information is information for notifying a user outside building 80 (specifically, the user of mobile terminal 60) that the standard action was not executed. Mobile terminal 60 receives the notification information and causes its display to show a notification screen for providing a notification that the standard action was not executed. FIG. 18 is a diagram illustrating an example of the notification screen for providing a notification that the standard action was not executed.

For example, if the user living in building 80 is an elderly person, a failure to execute the standard action as usual may suggest the occurrence of an abnormality in the user. A notification may then be provided to mobile terminal 60 carried by the user's relative living apart from the user, so that the relative can address the user's abnormality.

If executor 55 determines that the standard action has been executed in the identified time slot (Yes at S72), executor 55 sends no confirmation information or notification information.

As described above, for the standard action not executed as usual, control system 100 can ask the user in building 80 whether the standard action does not need to be executed. In addition, for the standard action not executed as usual, control system 100 can notify a user outside building 80 that the standard action was not executed as usual.

It is to be noted that, for the standard action not executed as usual, not both of the notification information and the confirmation information need to be sent. Rather, at least one of the notification information and the confirmation information may be sent.

Variations

In the above embodiment, devices 20 are controlled according to the user's voice inputs, and the standard action is registered based on the sending history information on control commands resulting from the user's voice inputs. Alternatively, devices 20 may be controlled according to the user's hand-inputted operation inputs to operation input interface 11, and the standard action may be registered based on sending history information resulting from the user's hand-inputted operation inputs to operation input interface 11. Further, devices 20 may be controlled according to the user's voice inputs or hand-inputted operation inputs, and the standard action may be registered based on sending history information resulting from both the user's hand-inputted operation inputs and the user's voice inputs.

The sending history information is a mere example of control history information on devices 20. Control system 100 may also register the standard action based on control history information other than the sending history information. For example, control system 100 may register the standard action based on the consecutiveness of control on devices 20 determined from history information on operation inputs for controlling devices 20 received by operation input interface 11. Control system 100 may also register the standard action based on the consecutiveness of control on devices 20 determined from history information on voice inputs for controlling devices 20 captured by voice capturer 17. The control history information may thus include the sending history information on control commands, the history information on operation inputs for controlling devices 20, and the history information on voice inputs for controlling devices 20.

In the above embodiment, voice capturer 17 provided in control apparatus 10 is used as a voice input user interface. Alternatively, a device separate from control apparatus 10 may be used as a voice input user interface. For example, a smart speaker or a mobile terminal may be used as a voice input user interface.

The functions of the voice recognition server and the device control server described in the above embodiment may be integrated into control apparatus 10. For example, controller 14 in control apparatus 10 may have the voice recognition function, the functions of registration unit 54, and the functions of executor 55. This allows control apparatus 10 to control devices 20 and register the standard action without communicating over wide area communication network 70.

Advantageous Effects, Etc

As described above, control system 100 includes: communication unit 51 that sends, to each of a plurality of devices 20, a control command for controlling such device 20; registration unit 54 that registers a standard action for collectively controlling at least two devices included in the plurality of devices 20, based on device (20) control consecutiveness which is determined by control history information of the plurality of devices 20; and executor 55 that causes communication unit 51 to send a control command to each of the at least two devices when execution of the standard action registered is instructed. In the above-described embodiment, the control command is sent from communication unit 51 to each of the at least two devices via control apparatus 10.

Such a control system 100 can automatically register the standard action without receiving operation input or voice input aimed at registering the standard action from the user.

Furthermore, for example, registration unit 54 registers the standard action if, based on the control history information, the at least two devices were controlled in a specific time slot on at least a predetermined number of consecutive days.

Such a control system 100 can automatically register the standard action based on the consecutiveness of control on device 20 which takes the time slot into consideration.

Furthermore, for example, registration unit 54 registers the standard action if, based on the control history information, the at least two devices were controlled within a predetermined period after a specific device included in the plurality of devices 20 was controlled, on at least a predetermined number of consecutive days.

Such a control system 100 can automatically register the standard action based on the consecutiveness of control on devices 20 which is determined according to the operating sequence of devices 20.

Furthermore, for example, registration unit 54 sets a name of the standard action registered, based on the specified time slot.

Such a control system 100 can set the name of the standard action based on the time slot in which the at least two devices are to be controlled.

Furthermore, for example, registration unit 54 sets a name of the standard action registered, based on types of the at least two devices.

Such a control system 100 can set the name of the standard action based on the types of the at least two devices (i.e., the kind of devices 20 that are included in the at least two devices).

Furthermore, for example, when a control command is sent to each of the at least two devices during execution of the standard action, registration unit 54 modifies a registered content of the standard action based on the control command.

Such a control system 100 can automatically change the registered content of the standard action without receiving operation input or voice input aimed at changing the registered content of the standard action from the user.

Furthermore, for example, in the modifying of the registered content, when a change command which is a control command for changing an operation state of a first device among the at least two devices is sent during execution of the standard action, a content of the control command to be sent to the first device when execution of the standard action is instructed is modified based on the change command.

Such a control system 100 can change the device control content in the standard action without receiving operation input or voice input aimed at changing the registered content of the standard action from the user.

Furthermore, for example, in the modifying of the registered content, when a control command is sent to a second device included in the plurality of devices 20 other than the at least two devices during execution of the standard action, the second device is included among devices to which a control command is to be sent when execution of the standard action is instructed.

Such a control system 100 can add a device to be controlled in the standard action without receiving operation input or voice input aimed at changing the registered content of the standard action from the user.

Furthermore, for example, in the modifying of the registered content, when a stop command which is a control command for stopping operation of a third device among the at least two devices is sent during execution of the standard action, the third device is excluded from devices to which a control command is to be sent when execution of the standard action is instructed, based on the stop command.

Such a control system 100 can remove a device to be controlled in the standard action without receiving operation input or voice input aimed at changing the registered content of the standard action from the user.

Furthermore, for example, when execution of the standard action is not instructed in a time slot in which the standard action was executed in the past, executor 55 further causes communication unit 51 to send confirmation information for confirming whether the standard action needs to be executed.

Such a control system 100 can, when the standard action is not being performed as per usual, confirm with a user inside building 80 if the standard action need not be executed.

Furthermore, for example, when execution of the standard action is not instructed in a time slot in which the standard action was executed in the past, executor 55 further causes communication unit 51 to send notification information for notifying that the standard action is not being executed.

Such a control system 100 can, when the standard action is not being performed as per usual, notify a user outside building 80 that the standard action is not being performed as per usual.

Furthermore, for example, when it is determined that a user instructing execution of the standard action registered does not satisfy a predetermined condition, executor 55 (i) modifies a content of the standard action to prevent communication unit 51 from sending a control command to a predetermined device among the at least two devices and (ii) executes the standard action.

Such a control system 100 can, when executing the standard action, change the content of the standard action according to an attribute, etc., of the user instructing the execution of the standard action. For example, when the user is a child, control system 100 can, taking safety into consideration, prevent some of the devices from operating.

Furthermore, for example, the execution of the standard action registered is instructed by voice by the user, and whether or not the user satisfies the predetermined condition is determined based on a voice of the user.

Such a control system 100 can, when executing the standard action, change the content of the standard action according to the voice of the user instructing the execution of the standard action.

Furthermore, for example, when it is determined that an amount of electricity used in a building in which the plurality of devices 20 are installed will exceed a predetermined amount when the standard action registered is executed, executor 55 modifies a content of the standard action and executes the standard action.

Such a control system 100 can, when executing the standard action, change the content of the standard action according to the amount of electricity used in building 80. For example, control system 100 can prevent some of the devices from operating in order to make the amount of electricity used in building 80 less than or equal to a predetermined value.

A control method executed by a computer such as control system 100 includes: sending, to each of a plurality of devices 20, a control command for controlling such device 20; registering a standard action for collectively controlling at least two devices included in the plurality of devices 20, based on device 20 control consecutiveness which is determined by control history information of the plurality of devices 20; and sending a control command to each of the at least two devices when execution of the standard action registered is instructed.

Such a control method can automatically register the standard action without receiving operation input or voice input aimed at registering the standard action from the user.

Other Embodiments

Although an embodiment has been described up thus far, the present invention is not limited to the foregoing embodiment.

For example, the control system is implemented by a plurality of devices in the foregoing embodiment but may be implemented by a single device. When the control system is implemented by a plurality of devices, the structural components included in the respective systems may be allocated to the devices in any way.

Furthermore, for example, there is no particular limitation as to the communication method between devices in the foregoing embodiment. Furthermore, the communication between devices may involve intervention by a relay device that is not shown in the figures. Moreover, the transmission path of information described in the foregoing embodiment is not limited to the transmission path shown in the sequence diagrams.

Furthermore, in the foregoing embodiment, a process executed by a particular processing unit may be executed by a different processing unit. Moreover, the order of multiple processes may be changed, and multiple processes may be executed in parallel.

Furthermore, in the foregoing embodiment, respective structural components may be realized by executing a software program suited to such structural components. The respective structural components may be implemented by a program executor such as a CPU or a processor reading out and executing the software program recorded in a recording medium such as a hard disk or a semiconductor memory.

Furthermore, the respective structural components may be realized by hardware. For example, the respective structural components may be a circuit (or an integrated circuit). These circuits as a whole may compose a single circuit or may be individual circuits. Moreover, each of the circuits may be implemented by a general-purpose circuit or a dedicated circuit.

Furthermore, general or specific aspects of the present invention may be implemented as a system, an apparatus, a method, an integrated circuit, a computer program, or a computer-readable recording medium such as a CD-ROM, or may be implemented as any combination of a system, an apparatus, a method, an integrated circuit, a computer program, and a recording medium.

For example, the present invention may be implemented as a control apparatus according to the foregoing embodiment or a control system corresponding thereto. Furthermore, the present invention may be implemented as a control method executed by a computer of the control system, or the like, and may be implemented as a program for causing a computer to execute such a program. The present invention may be implemented as a non-transitory computer-readable recording medium having such a program recorded thereon.

Forms obtained through various modifications to the respective embodiments conceived by those skilled in the art, as well as forms obtained by any combination of structural components and functions in the respective embodiments within the essence of the present invention are included in the present invention.

REFERENCE SIGNS LIST 20 device
51 communication unit
54 registration unit
55 executor
80 building
100 control system

The invention claimed is:

1. A control system including an apparatus, comprising:
a communication unit that sends, to each of a plurality of devices, a control command for controlling the device;
a registration unit that registers a standard action for collectively controlling at least two devices included in the plurality of devices, based on device control consecutiveness which is determined by control history information of the plurality of devices; and
an executor that causes the communication unit to send a control command to each of the at least two devices when execution of the standard action registered is instructed, wherein
a name is set to the standard action registered, and
an instruction for executing the standard action registered is an instruction that is based on the name set to the standard action.

2. The control system including an apparatus according to claim 1, wherein
the registration unit registers the standard action if, based on the control history information, the at least two devices were controlled in a specific time slot on at least a predetermined number of consecutive days.

3. The control system including an apparatus according to claim 1, wherein
the registration unit registers the standard action if, based on the control history information, the at least two devices were controlled within a predetermined period on at least a predetermined number of consecutive days, the predetermined period being after a specific device included in the plurality of devices was controlled.

4. The control system including an apparatus according to claim 2, wherein
the registration unit sets a name of the standard action registered, based on the specified time slot.

5. The control system including an apparatus according to claim 1, wherein
the registration unit sets a name of the standard action registered, based on types of the at least two devices.

6. The control system including an apparatus according to claim 1, wherein
when a control command is sent to each of the at least two devices during execution of the standard action, the registration unit modifies a registered content of the standard action based on the control command.

7. The control system including an apparatus according to claim 6, wherein
in the modifying of the registered content, when a change command which is a control command for changing an operation state of a first device among the at least two devices is sent during execution of the standard action, a content of the control command to be sent to the first device when execution of the standard action is instructed is modified based on the change command.

8. The control system including an apparatus according to claim 6, wherein
in the modifying of the registered content, when a control command is sent to a second device included in the plurality of devices other than the at least two devices during execution of the standard action, the second device is included among devices to which a control command is to be sent when execution of the standard action is instructed.

9. The control system including an apparatus according to claim 6, wherein
in the modifying of the registered content, when a stop command which is a control command for stopping operation of a third device among the at least two devices is sent during execution of the standard action, the third device is excluded from devices to which a control command is to be sent when execution of the standard action is instructed, based on the stop command.

10. The control system including an apparatus according to claim 1, wherein
when execution of the standard action is not instructed in a time slot in which the standard action was executed in the past, the executor further causes the communication unit to send confirmation information for confirming whether the standard action needs to be executed.

11. The control system including an apparatus according to claim 1, wherein
when execution of the standard action is not instructed in a time slot in which the standard action was executed in the past, the executor further causes the communication unit to send notification information for notifying that the standard action is not being executed.

12. The control system including an apparatus according to claim 1, wherein
when it is determined that a user instructing execution of the standard action registered does not satisfy a predetermined condition, the executor (i) modifies a content of the standard action to prevent the communication unit from sending a control command to a predetermined device among the at least two devices and (ii) executes the standard action.

13. The control system including an apparatus according to claim 12, wherein
the execution of the standard action registered is instructed by voice by the user, and
whether or not the user satisfies the predetermined condition is determined based on a voice of the user.

14. The control system including an apparatus according to claim 1, wherein
when it is determined that an amount of electricity used in a building in which the plurality of devices are installed will exceed a predetermined amount when the standard action registered is executed, the executor modifies a content of the standard action and executes the standard action.

15. A control method comprising:
sending, to each of a plurality of devices, a control command for controlling the device;
registering a standard action for collectively controlling at least two devices included in the plurality of devices, based on device control consecutiveness which is determined by control history information of the plurality of devices; and
sending a control command to each of the at least two devices when execution of the standard action registered is instructed, wherein a name is set to the standard action registered, and an instruction for executing the standard action registered is an instruction that is based on the name set to the standard action.

16. A non-transitory computer-readable recording medium having recorded thereon a program for causing a computer to execute the control method according to claim 15.

* * * * *